United States Patent [19]

Otsubo et al.

[11] Patent Number: 5,130,158

[45] Date of Patent: Jul. 14, 1992

[54] WHEAT FLOUR AND WHEAT FLOUR COMPOSITE FOR BREADSTUFF

[75] Inventors: Hiroshi Otsubo, Tokyo; Akira Takaya, Saitama, both of Japan

[73] Assignee: Nisshin Flour Milling Co., Ltd., Tokyo, Japan

[21] Appl. No.: 662,377

[22] Filed: Feb. 26, 1991

Related U.S. Application Data

[63] Continuation of Ser. No. 361,277, Jun. 5, 1989, abandoned.

[30] Foreign Application Priority Data

Jan. 31, 1989 [JP] Japan ................. 1-19776

[51] Int. Cl.⁵ ............................. A21D 2/18
[52] U.S. Cl. ..................... 426/622; 426/19; 426/20; 426/64; 426/549; 426/573; 426/575; 426/578
[58] Field of Search ............ 426/622, 64, 575, 19, 426/578, 20, 549, 573

[56] References Cited

U.S. PATENT DOCUMENTS 2,684,904  7/1954  Selman et al. ............... 426/64
4,748,032  5/1988  Kono et al. ............... 426/549

FOREIGN PATENT DOCUMENTS 3014671  1/1988  Japan ..................... 426/622

OTHER PUBLICATIONS

Lockwood, Joseph; Flour Milling, 1962, pp. 392–395, The Northern Publishing Co. LTD, Liverpool 1, England.
Pyler E. J., Baking Science and Technology, pp. 232–235, 423–425; Siebel Publishing Co.
Chemical Abstracts, 93 (1980), 166414h, "Flour Composition for Bread Making".

*Primary Examiner*—Jeanette Hunter
*Assistant Examiner*—Mary S. Mims
*Attorney, Agent, or Firm*—Abelman Frayne and Schwab

[57] ABSTRACT

There is disclosed a wheat flour comprising not less than 60% by weight of flours which pass through a screening surface having an opening of 75 microns and remain on a screening surface having an opening of 38 microns, which is suitable for the manufacture of a bread, a pasta and noodle. Also disclosed is a wheat flour composite for breadstuff wherein the wheat flour is compounded with a thicker and optionally a malt. The wheat flour composite is suitable for the manufacture of a high quality bread having good appearance, good textural and taste characteristics.

5 Claims, 1 Drawing Sheet

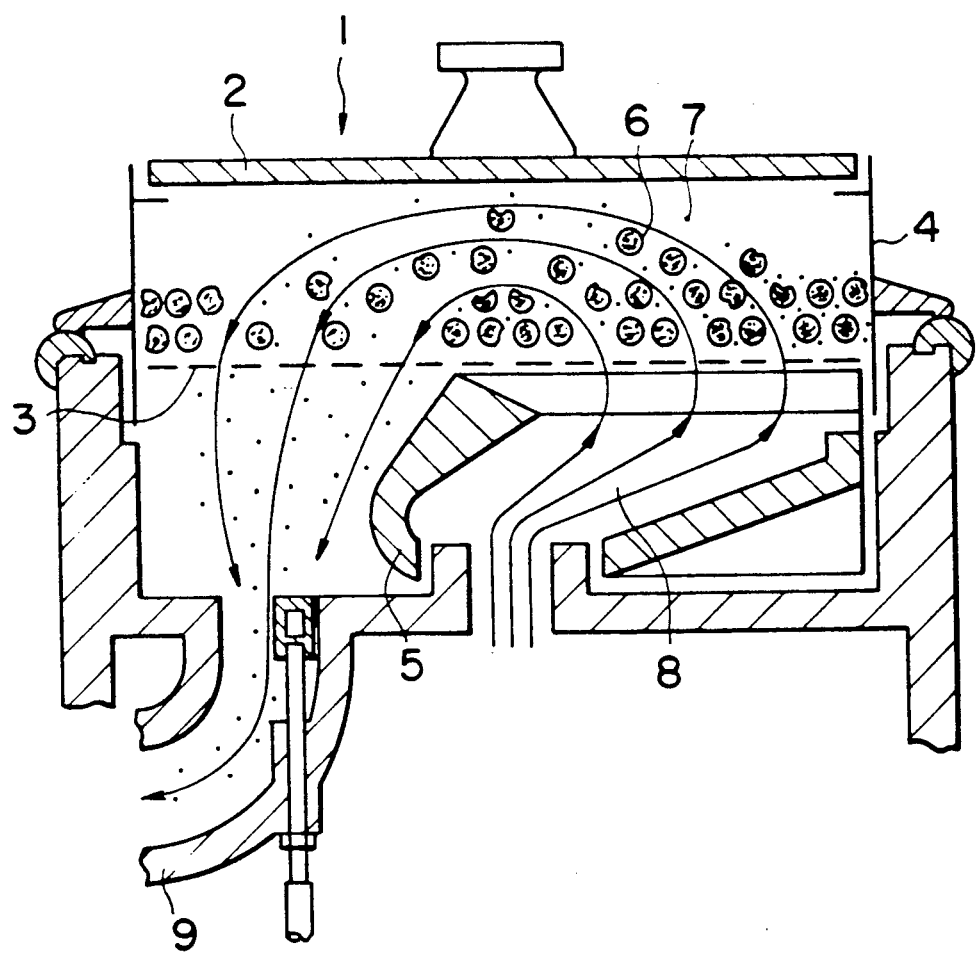

WHEAT FLOUR AND WHEAT FLOUR COMPOSITE FOR BREADSTUFF

This application is a continuation of application Ser. No. 361,277, filed Jun. 5, 1989, now abandoned.

FIELD OF THE INVENTION

This invention relates to a wheat flour having a specific particle size distribution and a wheat flour composite wherein the wheat flour is compounded with a thickener and optionally a malt.

BACKGROUND OF THE INVENTION

Wheat flours having lower ash content and higher protein content have been employed for the manufacture of "home-made" like, high grade-oriented bread having good appearance, good textural and taste characteristics. The reason is that lower ash content provides lower impurity to obtain a bread having white crumb and higher protein content (in the case of a wheat flour, higher gluten content) provides a dough with good water adsorption capacity and a bread with increased bread volume which is the desired properties for bread.

Conventional wheat flours as used in the ordinary breadmaking process are of unsatisfactory protein content for the manufacture of the bread having good quality as mentioned above. In this situation, it is conventional to increase the protein content by addition of vital gluten to the wheat flour. This gives rise to an increase in cost of the wheat flour, a reduction in taste characteristics of the bread and a variability in quality, etc. This also gives rise to the problem that the wheat flours having constant quality are not always available. An attempt to produce the wheat flour having higher protein content from a wheat per se has been unsuccessful, since this production gives rise to incorporating into the resultant flour a larger quantity of a bran coat rich in protein rather than an endosperm of the wheat, which results in the production of a low grade flour having high ash content.

SUMMARY OF THE INVENTION

The invention is based on the discovery that a v wheat flour having a specific particle size distribution classified from an ordinary wheat flour is particularly suitable for bread flour because of its having higher protein content and lower ash content.

An object of the invention is to provide a wheat flour having higher protein content and lower ash content which is suitable for the manufacture of a bread, a pasta and noodle.

Another object of the invention is to provide a wheat flour composite for breadstuff which is suitable for the manufacture of a high quality bread having good appearance, good textural and taste characteristics.

Other objects, features and advantages of the invention will be apparent from the following detailed description and appended claims.

BRIEF EXPLANATION OF THE DRAWINGS

The single drawing is a schematic longitudinal section of an apparatus for the measurement of a size particle distribution of the wheat flour.

DETAILED DESCRIPTION OF THE INVENTION

According to the invention, there is provided a wheat flour which comprises not less than 60% by weight, preferably 70% by weight of flours which pass through a screening surface having an opening of 75 microns and remain on a screening surface having an opening of 38 microns. The wheat flour having such a specific particle size distribution has a tendency to increase in protein content but rather to decrease in ash content and it is satisfactory for the breadmaking process, particularly for a breadflour.

If the flours passing through the screening surface having an opening of 75 microns and remaining on the screening surface having an opening of 38 microns are less than 60% by weight, the protein content is not increased remarkably in the flour and the ash content is not reduced, leading to unsatisfactory advantage.

The term "opening" as used herein refers to the minimum clear space between the edges of the opening in the screening surface and is given in microns.

In the commercial manufacture of the wheat flour according to the invention, a raw wheat flour having an ordinary particle size distribution, although depending on the degree of grinding, is subjected to classification treatment to separate and remove in any order from a raw wheat flour not less than about 60% by weight of fine particles having a particle size of not more than about 40 microns and not less than 40% by weight of coarse particles having a particle size of more than about 75 microns.

The raw wheat flours used in the present invention include ordinary breadflours such as strong flour, semi-strong flour or a mixture thereof, but not limiting thereto. Any raw wheat flours manufactured from wheat grains in conventional manner can be employed in the invention. Such raw wheat flours generally contain about 11.5 to 13.5% by weight of protein and about 0.32 to 0.55% by weight of ash. The classification treatment employed in the manufacture of the wheat flour according to the present invention includes any means generally used in this art, e.g., screening, air classification or a combination thereof which is preferred.

The particle size distribution of the wheat flour produced by classification treatment as mentioned above can be determined e.g., using an apparatus for the measurement of the particle size which is operated with suction under reduced pressure. An example of such apparatus is Air Jet Sieve Model 200LS manufactured by ALPINE Co. Ltd., West Germany, but not limited thereto.

Referring now to the drawing, the construction of the apparatus and the measurement for the particle size distribution of the wheat flour using this apparatus are illustrated below.

The Air Jet Sieve Model 200LS manufactured by ALPINE Co. Ltd., West Germany, has such a structure as shown in the drawing. It comprises a cylindrical fixed body 1 and a cylindrical sieve 4 disposed within the cylindrical fixed body 1 and having a diameter of 200 mm. The cylindrical sieve 4 includes a closure 2 and a wire mesh screen 3. The screen 3 defines the bottom of the sieve 4 and can be replaced by another screen together with the sieve 4. In the measurement for the particle size distribution of the wheat flour a mesh screen having an opening of 38 microns and a mesh screen having an opening of 75 microns are used exchangeably.

The screening is accomplished such that fine particles passing through the wire mesh screen are recovered through a suction port 9 connected with a vacuum cleaner (not shown), as indicated by arrow in the drawing. Air Jet is simultaneously applied to the screen through a nozzle 5 to prevent the screen from clogging, as shown also by arrow. The nozzle 5 is mounted about the central inner boss of the body in such a manner that the nozzle 5 can be rotated within the body at a rotational speed of 18 r.p.m.

In the practice of the present invention, one wire mesh screen having an opening of 75 microns is first mounted in the sieve which in turn was placed in place within the apparatus 10 grams of wheat flour to be measured are then introduced into the sieve. Under a reduced pressure of negative 4500 pa (which is 4500 pa lower than the atmospheric pressure), fine particles 7 are sucked down through a wire mesh screen 3 to perform a screening. Such a classification treatment is continued for about three or four minutes until particles 6 remaining on the screen 3 reached a constant weight. At this point, the weight of the wheat flour remaining on the screen 3 is defined as A gram.

Subsequently, the screen 3 is replaced by the other wire mesh screen having an opening of 38 microns. 10 grams of the wheat flour to be measured are introduced into the sieve 4 to which the other mesh screen is attached and screened in a similar manner as mentioned above. The weight of the wheat flour remaining on the mesh screen is defined as B gram.

The proportion of the wheat flour passing through one mesh screen having an opening of 75 microns and remaining on the other mesh screen having an opening of 38 microns is determined by the following equation.

$$\frac{B - A}{10} \times 100 \text{ (\% by weight)}$$

The wheat flour of the present invention advantageously contains increased amount of protein content without increase in the ash content in comparison with the raw wheat flour. The ash content may be rather reduced in comparison with the raw wheat flour. More particularly, the wheat flour of the present invention can contain the protein content about 5%—about 15% more than that of the raw wheat flour and the ash content about 0%—about 10% less than that of the raw wheat flour.

Further, the wheat flour of the present invention is smooth and does not substantially exhibit cohesiveness even after long period of stack, since it is free from a fine particle fraction and is of relatively uniform particle size.

As hereinbefore stated, the wheat flour of the present invention is characterized by higher protein content and lower ash content. It has been found however that a dough from the wheat flour of the present invention is inferior in property and the resulting bread also is inferior in quality to that produced from the ordinary wheat flour and also provides its reduced volume in the finished baked product. If a thickner and optionally a malt are added to the wheat flour of the present invention, a dough obtained therefrom is surprisingly improved in property and the resulting breads are remarkably improved in qualities as described below, in comparison with those produced from the ordinary wheat flours to which a thickner and optionally a malt are added.

1) The resulting bread has its increased volume.
2) The crumb grain of the finished product is improved.
3) The resulting bread is improved in textural and taste characteristics.
4) Staling is slowed down.
5) The whiter crumb is obtained.

According to the present invention, therefore, there is further provided a wheat flour composite for breadstuff wherein the wheat flour comprising not less than 60% by weight of flours which pass through a screening surface having an opening of 75 microns and remain on a screening surface having an opening of 38 microns is compounded with a thickner and optionally a malt.

In the manufacture of the bread using the wheat flour of the invention, a thickner or a combination of a malt therewith may be added to the dough being mixed. Conventional breadmaking processes can be employed in the present invention. A straight dough process is particularly preferred.

Any edible thickners can be employed in the invention, which include high-molecular materials such as alginic acid, sodium alginate, propylene glycol alginate, carboxymethylcellulose (CMC) and potassium and sodium salts thereof, carboxymethyl starch (CMS) and sodium salt thereof, sodium phosphate starch, methylcellulose, sodium polyacrylate, casein and sodium salt thereof; and food additive gum materials such as guar gum, locust bean gum, tragacanth gum, ghatti gum, acacia gum and karaya gum. Among them especially preferred are alginic acid, sodium alginate, CMC, CMS, guar gum and locust bean gum. One or more thickners may be used. The thickner is added usually in the proportion of about 0.2% to 1.0% and preferably 0.3% to 0.8% based on the total weight of the wheat flour.

The malts which may be used in the present invention include germinated barley, wheat or rye which contains very increased amount of enzymes such as amylase and the like. From the viewpoint of the extensibility and machinability of dough and the volume of breads to be produced, it is preferred that the wheat flour of the present invention is compounded with about 0.02% to 0.08% by weight of malt which is about 0.03—0.11 unit/mg and preferably 0.05—0.09 unit/mg as normally calculated by alpha-amylase activity and represented by Bernferd unit.

The malts generally used in the invention are those wherein a malt is dried and pulverized into powders having a particle size of about 10 to 100 microns or those wherein a malt extract is dried. Usually, easily available barley malt is used.

The thickner and malt may be blended into the wheat flour simultaneously or sequentially.

The invention is further illustrated by the following examples.

In the examples, the properties and qualities of the resulting doughs and breads are evaluated by ten panellers on the basis of ratings shown in Table 1. The results are then averaged. The particle size distribution of the wheat flour is measured by Air Jet Sieve Model 200LS.

TABLE 1

| Item | Point | Content |
| --- | --- | --- |
| Elasticity and | 5 | High elasticity, high extensibility |
| Extensibility | 4 | High elasticity, slightly |

TABLE 1-continued

| Item | | Point | Content |
|---|---|---|---|
| | | 3 | Slightly high elasticity, slightly high extensibility |
| | | 2 | High elasticity, low extensibility |
| | | 1 | Low elasticity, high extensibility |
| Dough | Gas Retaining capacity | 5 | Dough is very elongated and strong and gas cells are hardly broken. |
| | | 4 | Dough is slightly elongated and strong and gas cells are hardly broken. |
| | | 3 | Dough is less elongated and strong. |
| | | 2 | Dough is slightly slack and gas cells are easily broken. |
| | | 1 | Dough is very slack and gas cells are broken. |
| | Crumb grain | 5 | Crumb is very shiny and cell wall is very thin. |
| | | 4 | Crumb is shiny and cell wall is thin. |
| | | 3 | Crumb is slightly shiny and cell wall is slightly thin. |
| | | 2 | Crumb is not substantially shiny and cell wall is thick |
| | | 1 | Crumb is not shiny and cell wall is very thick. |
| Bread | Texture | 5 | Very soft and smooth |
| | | 4 | Soft and slightly smooth |
| | | 3 | Slightly hard and slightly harsh |
| | | 2 | Hard and harsh |
| | | 1 | Very hard and very harsh |
| | Eating quality | 5 | Very soft and very smooth |
| | | 4 | Soft and smooth |
| | | 3 | Slightly hard and slightly smooth |
| | | 2 | Hard and less smooth |
| | | 1 | Very hard and not smooth |

EXAMPLE 1

Strong wheat was milled in a conventional manner to provide a raw wheat flour having an ash content of 0.41% by weight, a crude protein content of 12.2% by weight and the following particle size distribution.

| | |
|---|---|
| Flour passing through the screening surface having an opening of 38 microns | 32% by weight |
| Flour passing through the screening surface having an opening of 75 microns and remaining on the screening surface having an opening of 38 microns | 46% by weight |
| Flour remaining on the screening surface having an opening of 75 microns | 22% by weight |

100 kg of the raw wheat flour was classified using a forced swirl rotating wall type air classifier (Turbo Classifier TC-15M manufactured by Nisshin Engineering Co., Ltd.) at a feed rate of 10 kg/hr., an air flow of 2.9 m³/min. and a rotation speed of 2350 r.p.m. to remove a fine fraction smaller than about 40 microns therefrom. This classified flour was further passed through the screening surface having an opening of 75 microns to remove a coarse fraction.

The resulting wheat flour contained an ash content of 0.39% by weight and a crude protein content of 13.8% by weight. The particle size distribution is shown below. The yield (% recovery) was about 50% by weight based on the total weight of the raw wheat flour.

| | |
|---|---|
| Flour passing through the screening surface having an opening of 38 microns | 15% by weight |
| Flour passing through the screening surface having an opening of 75 microns and remaining on the screening surface having an opening of 38 microns | 76% by weight |
| Flour remaining on the screening surface having an opening of 75 microns | 9% by weight |

EXAMPLE 2

Strong wheat was milled in a conventional manner to provide a raw wheat flour having an ash content of 0.42% by weight, a crude protein content of 12.4% by weight and the following particle size distribution.

| | |
|---|---|
| Flour passing through the screening surface having an opening of 38 microns | 28% by weight |
| Flour passing through the screening surface having an opening of 75 microns and remaining on the screening surface having an opening of 38 microns | 49% by weight |
| Flour remaining on the screening surface having an opening of 75 microns | 23% by weight |

10 kg of the raw wheat flour was classified using a forced swirl rotating wall type air classifier (Turbo Classifier TC-15M manufactured by Nisshin Engineering Co., Ltd.) at a feed rate of 10 kg/hr., an air flow of 2.9 m³/min. and a rotation speed indicated in Table 2 to remove a fine fraction smaller than about 40 microns therefrom. This classified flour was further classified using the same classifier under the same conditions except for changing the rotation speeds as shown in Table 2 to remove a coarse fraction.

The wheat flours (classified wheat flours) obtained after removal of fine and coarse fractions are of the particle size distribution, analytical value and yield based on the raw wheat flour as shown in Table 2.

TABLE 2

| | Comparative Example 1 | Example 2 (a) | (b) | (c) | (d) |
|---|---|---|---|---|---|
| R.P.M. of classifier | | | | | |
| for removal of fine fraction | 3900 | 3500 | 2700 | 2350 | 2100 |
| for removal of coarse fraction | 1260 | 1310 | 1330 | 1380 | 1430 |
| Classified wheat flour | | | | | |
| Particle size distribution (%) | | | | | |
| (−)38 microns[*1] | 31 | 29 | 19 | 17 | 14 |
| (+)38 microns to[*2] (−)75 microns | 57 | 60 | 71 | 78 | 83 |
| (+)75 microns[*3] | 12 | 11 | 10 | 5 | 3 |

TABLE 2-continued

|  | Comparative Example 1 | Example 2 | | | |
| --- | --- | --- | --- | --- | --- |
|  |  | (a) | (b) | (c) | (d) |
| Analysis |  |  |  |  |  |
| Ash (%) | 0.42 | 0.42 | 0.41 | 0.41 | 0.40 |
| Crude protein (%) | 12.7 | 13.1 | 13.7 | 14.1 | 14.4 |
| Yield (%) | 80 | 70 | 60 | 50 | 40 |

*[1]"(−)38 microns" refers to flour passing through the screening surface having an opening of 38 microns.
*[2]"(+)38 microns · (−)75 microns" refers to flour passing through the screening surface having an opening of 75 microns and remaining on the screening surface having an opening of 38 microns.
*[3]"(+)75 microns" refers to flour remaining on the screening surface having an opening of 75 microns.

EXAMPLE 3

The wheat flour of the present invention obtained in Example 1 was compounded with 0.4% by weight of each of thickners shown in Table 3 to provide wheat flour composites for breadstuff. These composites were used to produce open top breads according to the following formulation and straight dough process.

| Ingredient | Part by weight |
| --- | --- |
| Wheat flour composite for breadstuff | 100 |
| Yeast | 2 |
| Yeast food | 0.1 |
| Salt | 2 |
| Nonfat dry milk | 2 |
| Shortening | 4 |
| Sugar | 5 |
| Water | 67 |

| Step | Operation |
| --- | --- |
| Mixing | All the raw materials were thrown into a mixer bowl and mixed for two minutes at low speed and for eight minutes at moderate speed (at 27° C.). |
| Fermentation | The resultant dough was fermented for two hours under the condition of 28° C. and 75% R.H. |
| Dividing | The fermented dough was divided into separate portions of dough (480 g/piece) after degassing |
| Benching (Bench Time) | Each portion of fermented dough was subjected to benching for 20 minutes at room temperature. |
| Making up | The dough was made up to rod-like configuration. |
| Panning | Each rod-like dough was placed into a bread pan. |
| Final Proof | Each dough was subjected to additional fermentation for 45 minutes at 38° C. and 85% R.H. |
| Baking | The dough was baked in an oven at 220° C. for 30 minutes. |

For comparative Example 2, the breads were produced by using the same formulations as shown in Table 3 except that the classified wheat flour of the present invention was replaced by the raw wheat flour before classification as used in Example 1.

The properties of the doughs and the qualities of the resulting breads are shown in Table 3.

TABLE 3

| Wheat Flour Composite for Breadstuff | | | | | | | |
| --- | --- | --- | --- | --- | --- | --- | --- |
| | Type of Wheat Flour | Example 3 Wheat Flour of the Invention | | | | | |
| | | (a) | (b) | (c) | (d) | (e) | (f) |
| | Type of Thickner | Alginic acid | Sodium alginate | CMC | CMS | Guar gum | Locust bean gum |
| Dough | Elasticity & Extensibility | 5 | 5 | 5 | 5 | 5 | 5 |
| | Gas Retaining Capacity | 4 | 4 | 4 | 4 | 4 | 4 |
| Bread | Volume (cc) | 2110 | 2130 | 2130 | 2110 | 2120 | 2100 |
| | Crumb Grain | 5 | 5 | 5 | 5 | 5 | 5 |
| | Texture | 4 | 4 | 4 | 4 | 4 | 4 |
| | Eating Quality just after baked | 5 | 5 | 5 | 5 | 5 | 5 |
| | Eating Quality after 3 days from baking | 4 | 4 | 4 | 4 | 4 | 4 |
| | Type of Wheat Flour | Comparative Example 2 Raw Wheat Flour | | | | | |
| | | (a) | (b) | (c) | (d) | (e) | (f) |
| | Type of Thickner | Alginic acid | Sodium alginate | CMC | CMS | Guar gum | Locust bean gum |
| Dough | Elasticity & Extensibility | 2 | 2 | 2 | 2 | 2 | 2 |
| | Gas Retaining Capacity | 3 | 3 | 3 | 3 | 3 | 3 |
| Bread | Volume (cc) | 1940 | 1950 | 1950 | 1930 | 1940 | 1900 |
| | Crumb Grain | 4 | 4 | 4 | 4 | 4 | 4 |
| | Texture | 2 | 2 | 2 | 2 | 2 | 2 |
| | Eating Quality just after baked | 3 | 3 | 3 | 3 | 3 | 3 |
| | Eating Quality after 3 days from | 2 | 2 | 2 | 2 | 2 | 2 |

TABLE 3-continued

Wheat Flour Composite for Breadstuff baking

EXAMPLE 4

The wheat flour of the present invention as obtained in Example 1 was blended with 0.3% of guar gum based on the total weight thereof to provide a wheat flour composite for breadstuff.

A mixture of 70 parts by weight of the above composite, 2 parts by weight of yeast and 2 parts by weight of sugar dissolved in 10 parts by weight of water was placed in a mixer. Further, 35 parts by weight of water were added to this mixture. The mixture was then mixed to prepare a dough (at a mixing temperature of 24° C.). The dough was then placed within a container which in turn was placed within a fermentation room. The dough was fermented in the fermentation room for four hours at a temperature of 27° C. and a humidity of 75% R.H. to form a sponge. To this sponge were added 30 parts by weight of the aforementioned wheat flour composite, 5 parts by weight of sugar, 2 parts by weight of salt, 2 parts by weight of nonfat dry milk powder and 22 parts by weight of water. After the sponge was thoroughly mixed with the above ingredients, 6 parts by weight of shortening were further added and further sufficiently mixed (at a mixing temperature of 27° C.). After floor time for 20 minutes, the dough was divided, rounded, subjected to bench time for 20 minutes, made up and placed in the respective bread pans. The dough pieces in the pans were then subjected to a fermentation so called a final proof at a temperature of 38° C. and 85% R.H. A measure of the fermentation completed was the time at which the dough piece was expanded about 80 to 85% of the volume of the respective pan. The expanded dough pieces were placed into an oven at 220° C. and baked for about 40 minutes to form open top breads.

For Comparative Example 3, open top breads were produced in the same manner as that of Example 4 except that the classified wheat flour of the present invention obtained in Example 1 was replaced by the raw wheat flour before classification used in Example 1.

Evaluations of bread quality are shown in Table 4 below.

TABLE 4

|  | Example 4 | Comparative Example 3 |
|---|---|---|
| Volume (cc) | 2250 | 1980 |
| Crumb grain | 5 | 3 |
| Texture | 5 | 3 |
| Eating quality | 5 | 4 |

EXAMPLE 5

Open top breads were produced in accordance with the following formulation by the same process as in Example 3.

| Ingredient | Part by weight |
|---|---|
| Wheat flour (produced according to the present invention in Example 1) | 100 |
| Yeast | 2 |
| Yeast food | 0.1 |
| Salt | 2 |
| Nonfat dry milk | 2 |
| Shortening | 4 |
| Sugar | 5 |
| CMC | as shown in Table 5 |
| Water | as shown in Table 5 |

For Comparative Example 4, open top breads were produced in the same manner as that of Example 5 except that the classified wheat flour of the present invention obtained in Example 1 was replaced by the raw wheat flour before classification used in Example 1.

The qualities of the resulting doughs and breads are shown in Table 5.

TABLE 5

Wheat Flour Composite for Breadstuff

|  | Type of Wheat Flour | Example 5 Wheat Flour of the Invention | | | | | Comparative Example 4 Raw wheat flour |
|---|---|---|---|---|---|---|---|
|  |  | (a) | (b) | (c) | (d) | (e) |  |
|  | CMC added (part by weight) | 0.2 | 0.3 | 0.6 | 0.8 | 1.0 | 0.4 |
| Dough | Water Absorption Capacity (%) | 65 | 66 | 69 | 70 | 72 | 67 |
|  | Elasticity & Extensibility | 4 | 5 | 4 | 4 | 3 | 2 |
|  | Gas Retaining Capacity | 4 | 4 | 4 | 4 | 4 | 3 |
| Bread | Volume (cc) | 2010 | 2130 | 2090 | 2070 | 2000 | 1940 |
|  | Crumb Grain | 4 | 5 | 5 | 5 | 4 | 4 |
|  | Texture | 4 | 4 | 4 | 4 | 3 | 2 |
|  | Eating Quality just after baked | 4 | 5 | 5 | 5 | 4 | 2 |
|  | Eating Quality after 3 days from baking | 4 | 4 | 4 | 4 | 4 | 2 |

EXAMPLE 6

Open top breads were produced by using the same formulation and process as in Example 5 except that CMC was replaced by guar gum.

For Comparative Example 5, open top breads were produced in the same manner as in Example 6 except that the classified wheat flour of the present invention was replaced by the raw wheat flour before classification used in Example 1.

Evaluations of the doughs and breads are shown in Table 6.

that the classified wheat flour of the present invention was replaced by the raw wheat flour before classifica-

TABLE 6

| | | Wheat Flour Composite for Breadstuff | | | | | |
|---|---|---|---|---|---|---|---|
| | | Example 6 Wheat Flour of the Invention | | | | | Comparative Example 5 |
| Type of Wheat Flour | | (a) | (b) | (c) | (d) | (e) | Raw wheat flour |
| Dough | Guar gum added (part by weight) | 0.2 | 0.3 | 0.6 | 0.8 | 1.0 | 0.4 |
| | Water Absorption Capacity (%) | 65 | 66 | 69 | 70 | 72 | 67 |
| | Elasticity & Extensibility | 4 | 5 | 4 | 4 | 3 | 2 |
| | Gas Retaining Capacity | 4 | 4 | 4 | 4 | 4 | 3 |
| Bread | Volume (cc) | 2000 | 2120 | 2100 | 2080 | 2010 | 1930 |
| | Crumb Grain | 4 | 5 | 5 | 5 | 4 | 4 |
| | Texture | 4 | 4 | 4 | 4 | 3 | 2 |
| | Eating Quality just after baked | 4 | 5 | 5 | 5 | 4 | 2 |
| | Eating Quality after 3 days from baking | 4 | 4 | 4 | 4 | 4 | 2 |

EXAMPLE 7

A wheat flour composite for breadstuff was obtained by blending the classified wheat flour of the present invention obtained in Example 1 with alginic acid and malt in the proportion as shown in Table 7.

The malt used herein was a barley malt ("Malt Powder" manufactured by Oriental Yeast Co., Ltd.), which had an average particle size of 30 microns and an alpha-amylase activity of 0.05 unit/mg.

The wheat flour composite for breadstuff was used with the following formulation to produce open top breads by the same process as in Example 3.

| Ingredient | Part by weight |
|---|---|
| Wheat flour composite for breadstuff | 100 |
| Yeast | 2 |
| Yeast food | 0.1 |
| Salt | 2 |
| Nonfat dry milk | 2 |
| Shortening | 4 |
| Sugar | 5 |
| Water | 67 |

For Comparative Example 6, open top breads were produced in the same manner as in Example 7 except tion used in Example 1 and the malt was used in the amount indicated in Table 7.

Evaluations of the doughs and breads are shown in Table 7.

TABLE 7

| | Wheat Flour Composite for Breadstuff | | | |
|---|---|---|---|---|
| | | Example 7 | Comparative Example 6 Raw wheat flour | |
| Type of Wheat Flour | | Wheat Flour of the Invention | (a) | (b) |
| Dough | Alginic acid added (part by weight) | 0.4 | 0.4 | 0.4 |
| | Malt added (part by weight) | 0.05 | 0.05 | — |
| | Elasticity & Extensibility | 5 | 2 | 2 |
| | Gas Retaining Capacity | 5 | 3 | 3 |
| Bread | Volume (cc) | 2200 | 1940 | 1940 |
| | Crumb Grain | 5 | 3 | 3 |
| | Texture | 5 | 3 | 3 |
| | Eating Quality just after baked | 5 | 4 | 3 |
| | Eating Quality after 3 days from baking | 5 | 4 | 3 |

EXAMPLE 8

A wheat flour composite for breadstuff was obtained in the same manner as in Example 7 except that the malt in the wheat flour composite for breadstuff of Example 7 was replaced by a barley malt (manufactured by Oriental Yeast Co., Ltd.) having an average particle size of 30 microns and an alpha-amylase activity of 0.087 unit/mg and the barley malt was used in the proportions as indicated in Table 8.

The wheat flour composite for breadstuff was used with the same formulation as in Example 7 to produce open top breads by the same process as in Example 7.

For Comparative Example 7, open top breads were produced in the same manner as in Example 8 except that the classified wheat flour of the present invention was replaced by the raw wheat flour before classification used in Example 1.

Evaluations of the doughs and breads are shown in Table 8.

TABLE 8

| | | Wheat Flour Composite for Breadstuff | | | | | |
|---|---|---|---|---|---|---|---|
| | Type of | Example 8 Wheat Flour of the Invention | | | | | Comparative Example 7 |
| | Wheat Flour | (a) | (b) | (c) | (d) | (e) | Raw wheat flour |
| | Malt added (part by weight) | 0 | 0.01 | 0.02 | 0.05 | 0.08 | 0.05 |
| Dough | Elasticity & Extensibility | 5 | 5 | 5 | 5 | 5 | 2 |
| | Gas Retaining Capacity | 4 | 4 | 5 | 5 | 5 | 3 |
| Bread | Volume (cc) | 2110 | 2120 | 2150 | 2210 | 2170 | 1930 |
| | Crumb Grain | 5 | 5 | 5 | 5 | 4 | 3 |
| | Texture | 4 | 5 | 5 | 5 | 5 | 3 |
| | Eating Quality just after baked | 5 | 5 | 5 | 5 | 5 | 4 |
| | Eating Quality after 3 days from baking | 4 | 4 | 4 | 5 | 5 | 4 |

EXAMPLE 9

A wheat flour composite for breadstuff was obtained using the same formulation as stated in Example 8 except that alginic acid was replaced by the same amount of CMC and the amounts of the malt compounded were changed as shown in Table 9.

The wheat flour composite for breadstuff was used with the same formulation as in Example 7 to produce open op breads by the same process as in Example 7.

For Comparative Example 8, open top breads were produced in the same manner as in Example 9 except that the classified wheat flour of the present invention was replaced by the raw wheat flour before classification used in Example 1.

Evaluations of the doughs and breads are shown in Table 9.

EXAMPLE 10

A wheat flour composite for breadstuff was obtained using the same formulation as stated in Example 8 except that alginic acid was replaced by the same amount of guar gum and the amounts of the malt compounded were changed as shown in Table 10.

The wheat flour composite for breadstuff was used with the same formulation as in Example 7 to produce open top breads by the same process as in Example 7.

For Comparative Example 9, open top breads were produced in the same manner as in Example 10 except that the classified wheat flour of the present invention was replaced by the raw wheat flour before classification used in Example 1.

Evaluations of the doughs and breads are shown in Table 10.

TABLE 9

| | | Wheat Flour Composite for Breadstuff | | | | | |
|---|---|---|---|---|---|---|---|
| | Type of | Example 9 Wheat Flour of the Invention | | | | | Comparative Example 8 |
| | Wheat Flour | (a) | (b) | (c) | (d) | (e) | Raw wheat flour |
| | Malt added (part by weight) | 0 | 0.01 | 0.02 | 0.05 | 0.08 | 0.05 |
| Dough | Elasticity & Extensibility | 5 | 5 | 5 | 5 | 5 | 2 |
| | Gas Retaining Capacity | 4 | 4 | 5 | 5 | 5 | 3 |
| Bread | Volume (cc) | 2120 | 2130 | 2160 | 2210 | 2180 | 1940 |
| | Crumb Grain | 5 | 5 | 5 | 5 | 4 | 3 |
| | Texture | 4 | 5 | 5 | 5 | 5 | 3 |
| | Eating Quality just after baked | 5 | 5 | 5 | 5 | 5 | 4 |
| | Eating Quality after 3 days from baking | 4 | 4 | 4 | 5 | 5 | 4 |

TABLE 10

| | | Wheat Flour Composite for Breadstuff | | | | | |
|---|---|---|---|---|---|---|---|
| | Type of | Example 10 Wheat Flour of the Invention | | | | | Comparative Example 9 |
| | Wheat Flour | (a) | (b) | (c) | (d) | (e) | Raw wheat flour |
| | Malt added (part by weight) | 0 | 0.01 | 0.02 | 0.05 | 0.08 | 0.05 |
| Dough | Elasticity & Extensibility | 5 | 5 | 5 | 5 | 5 | 2 |
| | Gas Retaining Capacity | 4 | 4 | 5 | 5 | 5 | 3 |
| Bread | Volume (cc) | 2110 | 2120 | 2150 | 2200 | 2180 | 1920 |
| | Crumb Grain | 5 | 5 | 5 | 5 | 4 | 3 |
| | Texture | 4 | 5 | 5 | 5 | 5 | 3 |
| | Eating Quality | 5 | 5 | 5 | 5 | 5 | 4 |

TABLE 10-continued

| Type of Wheat Flour | Wheat Flour Composite for Breadstuff | | | | | Comparative Example 9 Raw wheat flour |
|---|---|---|---|---|---|---|
| | Example 10 Wheat Flour of the Invention | | | | | |
| | (a) | (b) | (c) | (d) | (e) | |
| just after baked Eating Quality after 3 days from baking | 4 | 4 | 4 | 5 | 5 | 4 |

EXAMPLE 11

Each of the classified wheat flours (a) to (d) of the present invention obtained in Example 2 was compounded with 0.4% by weight of alginic acid or a combination of 0.4% by weight of alginic acid and 0.05% by weight of malt powder (the same as used in Example 7), respectively based on the total weight of the wheat flour to prepare each of the wheat flour composites for breadstuff according to the present invention.

For Comparative Example 10, the raw wheat flour used in Example 2 and the wheat flour obtained in Comparative Example 1 were respectively compounded with the same ingredients as used in Example 11 to each of the wheat flour composites for breadstuff.

Each of the above wheat flour composites for breadstuff was used with the following formulation to produce each of open top breads by the same process as in Example 3.

| Ingredient | Part by weight |
|---|---|
| Wheat flour composite for breadstuff | 100 |
| Yeast | 2 |
| Yeast food | 0.1 |
| Salt | 2 |
| Nonfat dry milk | 2 |
| Shortening | 4 |
| Sugar | 5 |
| Water | 67 |

Evaluations of the doughs and breads are shown in Table 11.

TABLE 11

| | | Wheat Flour Composite for Breadstuff | | | | | | | | | |
|---|---|---|---|---|---|---|---|---|---|---|---|
| | | Example 11 | | | | | | | | | |
| | Type of Wheat Flour | (a) EX. 2 (a) | (b) EX. 2 (b) | (c) EX. 2 (c) | (d) EX. 2 (d) | (e) EX. 2 (a) | (f) EX. 2 (b) | (g) EX. 2 (c) | (h) EX. 2 (d) | (i) EX. 2 (a) | (j) EX. 2 (b) |
| | Alginic acid added (%) | 0 | 0 | 0 | 0 | 0.4 | 0.4 | 0.4 | 0.4 | 0.4 | 0.4 |
| | Malt powder added (%) | 0 | 0 | 0 | 0 | 0 | 0 | 0 | 0 | 0.05 | 0.05 |
| Dough | Elasticity & Extensibility | 2 | 2 | 1 | 1 | 4 | 4 | 5 | 5 | 5 | 5 |
| | Gas Retaining Capacity | 2 | 1 | 1 | 1 | 4 | 4 | 4 | 4 | 4 | 4 |
| Bread | Volume (cc) | 1840 | 1840 | 1800 | 1830 | 2080 | 2090 | 2100 | 2150 | 2160 | 2200 |
| | Crumb Grain | 2 | 2 | 2 | 2 | 5 | 5 | 5 | 5 | 5 | 5 |
| | Texture | 3 | 3 | 2 | 2 | 4 | 4 | 4 | 4 | 4 | 5 |
| | Eating Quality just after baked | 2 | 2 | 2 | 2 | 4 | 4 | 5 | 5 | 5 | 5 |
| | Eating Quality after 3 days from baking | 2 | 2 | 1 | 1 | 4 | 4 | 4 | 4 | 4 | 4 |

| | | Example 11 | | Comparative Example 10 | | | | | |
|---|---|---|---|---|---|---|---|---|---|
| | Type of Wheat Flour | (k) EX. 2 (c) | (l) EX. 2 (d) | (a) raw wheat flour | (b) Comp. EX. 1 | (c) raw wheat flour | (d) Comp. EX. 1 | (e) raw wheat flour | (f) Comp. EX. 1 |
| | Alginic acid added (%) | 0.4 | 0.4 | 0 | 0 | 0.4 | 0.4 | 0.4 | 0.4 |
| | Malt powder added (%) | 0.05 | 0.05 | 0 | 0 | 0 | 0 | 0.05 | 0.05 |
| Dough | Elasticity & Extensibility | 5 | 5 | 3 | 3 | 2 | 2 | 2 | 2 |
| | Gas Retaining Capacity | 5 | 5 | 2 | 2 | 3 | 3 | 3 | 3 |
| Bread | Volume (cc) | 2240 | 2260 | 1900 | 1890 | 1950 | 2000 | 1960 | 2040 |
| | Crumb Grain | 5 | 5 | 3 | 3 | 4 | 4 | 3 | 3 |
| | Texture | 5 | 5 | 3 | 3 | 2 | 2 | 3 | 3 |
| | Eating Quality just after baked | 5 | 5 | 3 | 3 | 3 | 3 | 4 | 4 |
| | Eating Quality after 3 days from baking | 5 | 5 | 2 | 2 | 2 | 2 | 4 | 4 |

What is claimed is:

1. A wheat flour composite which comprises a wheat flour comprising not less than 60% by weight of flours which pass through a screening surface having an opening of 75 microns and remains on a screening surface having an opening of 38 microns, in combination with a thickener and optionally a malt.

2. A wheat flour composite of claim 1 wherein the wheat flour is compounded with the thickener and malt.

3. A wheat flour composite of claim 1 wherein the thickener is selected from the group consisting of alginic acid, sodium alginate, carboxymethylcellulose, carboxymethyl starch, guar gum or locust bean gum.

4. A wheat flour composite of claim 1 wherein the thickener is compounded in an amount of about 0.2% to 1.0% based on the total weight of the wheat flour.

5. A wheat flour composite of claim 1 wherein the malt is compounded in an amount of about 0.02 to 0.08% based on the total weight of the wheat flour.

* * * * *